US00RE39720E

(19) United States
(12) Reissued Patent
Murphy et al.

(10) Patent Number: US RE39,720 E
(45) Date of Reissued Patent: Jul. 10, 2007

(54) CATALYTIC REDUCTION OF EMISSIONS FROM INTERNAL COMBUSTION ENGINES

(75) Inventors: Oliver J. Murphy, Bryan, TX (US); Craig C. Andrews, College Station, TX (US)

(73) Assignee: Lynntech, Inc., College Station, TX (US)

(21) Appl. No.: 10/206,157

(22) Filed: Apr. 3, 2001

Related U.S. Patent Documents

Reissue of:
(64) Patent No.: 6,122,909
Issued: Sep. 26, 2000
Appl. No.: 09/163,068
Filed: Sep. 29, 1998

(51) Int. Cl.
*F01N 3/00* (2006.01)

(52) U.S. Cl. ..... 60/286; 60/274; 60/275; 60/284; 60/289; 60/303; 123/DIG. 12; 123/1 A; 204/263; 205/628

(58) Field of Classification Search ..... 60/284, 60/286, 289, 300, 301, 303, 307, 274, 275; 123/1 A, 3, DIG. 12
See application file for complete search history.

(56) References Cited

U.S. PATENT DOCUMENTS

| | | | | | |
|---|---|---|---|---|---|
| 3,896,616 | A | * | 7/1975 | Keith et al. | 60/274 |
| 3,908,371 | A | * | 9/1975 | Nagai et al. | 60/301 |
| 4,442,801 | A | | 4/1984 | Glynn et al. | 123/DIG. 12 |
| 5,272,871 | A | | 12/1993 | Oshims | 60/274 |
| 5,441,401 | A | | 8/1995 | Yamaguro | 431/4 |
| 5,543,124 | A | | 8/1996 | Yokota | 423/239.1 |
| 5,786,104 | A | | 7/1998 | Black | 429/13 |
| 5,787,864 | A | | 8/1998 | Collier, Jr. et al. | 123/492 |
| 5,813,222 | A | | 9/1998 | Appleby | 60/286 |
| 5,921,076 | A | | 7/1999 | Krutzsch et al. | 60/274 |
| 5,953,908 | A | * | 9/1999 | Appleby | 60/275 |

FOREIGN PATENT DOCUMENTS

| | | |
|---|---|---|
| JP | 4318214 | 11/1992 |
| WO | WO 90/14312 | 11/1990 |
| WO | WO 96/11330 | 4/1996 |

* cited by examiner

*Primary Examiner*—Thomas Denion
*Assistant Examiner*—Diem Tran
(74) *Attorney, Agent, or Firm*—Streets & Steele; Jeffrey L. Streets

(57) ABSTRACT

An apparatus for treating an exhaust gas stream from cold startup through continuous operating conditions of an internal combustion engine includes an oxidizing catalyst bed disposed in an exhaust pipe and a reducing catalyst bed disposed in the exhaust pipe downstream from the oxidizing catalyst bed. The oxidizing catalyst bed as one or more oxidizing catalysts and the reducing catalyst bed has one or more reducing catalysts. A method is provided for treating an exhaust gas stream both during cold start and during continuous operating conditions of an internal combustion engine by passing the stream through an oxidizing catalyst bed having one or more oxidizing catalysts at a light off temperature; a reducing catalyst bed having one or more reducing catalysts and providing hydrogen into the reducing catalyst bed to condition the reducing catalyst; and introducing hydrogen into the internal combustion engine during cold startup.

35 Claims, 4 Drawing Sheets

CATALYTIC REDUCTION OF EMISSIONS FROM INTERNAL COMBUSTION ENGINES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and apparatus for preventing, decomposing and removing emissions from an internal combustion engine. More particularly, the invention relates to a method and apparatus for preventing, decomposing and removing emissions under both cold start conditions and during continuous operation of an internal combustion engine.

2. Background of the Related Art

The exhaust gases from boilers, smelters, diesel generators, jet engines, gas turbine engines, automobiles, and trucks contain considerable amounts of nitrogen oxide compounds ($NO_x$), unburned hydrocarbons (HCs) and carbon monoxide (CO). Nitrogen oxide, though thermodynamically unstable, does not spontaneously decompose in the absence of a catalyst. For emissions from engine operations usually near-stoichiometric air/fuel ratios, the reduction of $NO_x$ by CO and residual hydrocarbons is achieved by what is often called a "three way catalyst" (TWC). No satisfactory catalyst system exists, however, for $NO_x$, HCs and CO abatement in exhaust gases from internal combustion engines which contain an excess of fuel under cold start conditions and an excess of oxygen under continuous operation conditions.

TWC catalysts are currently formulated and designed to be effective over a specific operating range of both lean and rich fuel/air conditions and a specific operating temperature range. These particulate catalyst compositions enable optimization of the conversion of HCs, CO, and $NO_x$. This purification of the exhaust stream by the catalytic converter is dependent upon the temperature of the exhaust gas and the catalytic converter works optimally at an elevated catalyst temperature, generally at or above about 300° C. The time period between when the exhaust emissions begin (i.e., "cold start"), until the time when the substrate heats up to a light-off temperature, is generally referred to as the light-off time. Light-off temperature is generally defined as the catalyst temperature at which fifty percent (50%) of the emissions from the engine are being converted as they pass through the catalyst.

The conventional method of heating the catalytic converter is to heat the catalyst by contact with high temperature exhaust gases from the engine. This heating, in conjunction with the exothermic nature of the oxidation reactions occurring at the catalyst, will bring the catalyst to light-off temperature. However, until the light-off temperature is reached, the exhaust gases pass through the catalytic converter relatively unchanged. In addition, the composition of the engine exhaust gas changes as the engine temperature increase from a cold start temperature to an operating temperature, and the typical TWC is designed to work best with the exhaust gas composition that is present at normal elevated engine operating temperatures.

Selective Catalytic Reduction (SCR) is one measure that is being explored with regard to $NO_x$ reduction. Ammonia is injected into the exhaust gases to react with $NO_x$ over a catalyst to form nitrogen and water. Three types of catalysts have been used, including base metal systems, noble metal systems and zeolite systems. The noble metal catalysts operate in a low temperature regime (240–270° C.), but are inhibited by the presence of $SO_2$. The base metal catalysts, such as vanadium pentoxide and titanium dioxide, operate in the intermediate temperature range (310°–400° C.), but at high temperatures they tend to promote oxidation of $SO_2$ to $SO_3$. The zeolites can withstand temperatures up to 600° C. and, when impregnated with a base metal, have an even wider range of operating temperatures.

SCR systems with ammonia as a reductant have been successfully employed to yield $NO_x$ reduction efficiencies of more than 80% in large natural gas fired turbine engines, and lean burn diesel engines (that run rich in oxygen). However, problems arise due to a strong dependence of the ammonia reaction and the catalyst life on exhaust gas temperature. The requirement of ammonia itself presents several problems. Ammonia is a toxic gas and is included in the EPA's list of extremely hazardous substances. The most critical aspect of SCR systems include safe ammonia handling, control of reactor temperature at all operating conditions, control of exhaust temperatures, and a dynamic ammonia dosage control system to maintain an optimum ammonia/$NO_x$ mole ratio under varying engine speed and load conditions. Some ammonia slip is unavoidable due to imperfect distribution of the reacting gases.

Selective Catalytic Reduction with hydrocarbons is another measure used to reduce NOx emissions. $NO_x$ can be selectively reduced by a variety of organic compounds (e.g. alkanes, olefins, alcohols) over several catalysts under excess $O_2$ conditions. The injection of diesel or methanol has been explored in heavy-duty stationary diesel engines to supplement the HCs in the exhaust stream. However, the conversion efficiency was significantly reduced outside the narrow temperature range of 300° C. to 400° C. In addition, this technique suffers from the same problems as those of SCR with ammonia, such as HC-slippage over the catalyst, transportation and on-site bulk storage of hydrocarbons, and possible accidental release of the HCs into the atmosphere. The partial oxidation of hydrocarbons also releases undesirable CO, unburned HCs and particulates.

Another method to decrease NOx proposes using combustion at excessively lean air-fuel ratios to provide a combination of a decrease in NOx emissions and an increase in fuel economy in a lean burn engine. However, when a vehicle engine is operated at air-fuel ratios lean enough to decrease NOx, the combustion approaches a misfire limit, and driveability is impaired. To prevent this, an improvement has been proposed, wherein turbulences are generated within an engine cylinder so that the burning velocity is increased to thereby shift the misfire limit to the lean side. However, if the turbulences are excessive and the flow velocity becomes too high, formation of a flame core and propagation of the flame in an early period of combustion will be obstructed. Another improvement has been proposed, where the air-fuel ratio distribution within an engine cylinder is controlled so that rich air-fuel mixtures are formed only in a region close to the ignition plug to produce easy ignition. However, when the misfire limit is shifted to the lean side, the effect on the NOx concentration also is decreased.

Another proposed method to decrease NOx provides an engine with air-fuel ratios slightly closer to the stoichiometric air-fuel ratio than the misfire limit and then purifies the insufficiently decreased NOx by using a zeolite-type lean NOx catalyst. This method has the potential to provide a clean system that also has good fuel economy. However, since the lean NOx catalyst can operate only under oxidizing exhaust gas conditions and is usually exposed to high temperatures, it is difficult to obtain both a sufficiently high NOx conversion by the lean NOx catalyst and a durable catalyst.

Lean burn engines, including lean burn gasoline engines and diesel engines, produce an exhaust gas that has an excess of oxygen ($O_2$), that is, they are operated under oxidizing gas conditions. The leaner the air-fuel ratio, the greater is the concentration of $O_2$ included in the exhaust gas. A catalyst which reduces NOx under oxidizing gas conditions is defined as a lean NOx catalyst, which is usually composed of a noble metal-type catalyst or a zeolite-type catalyst. At temperatures above 350° C., NOx reduction occurs primary by reaction with HC, while at low temperatures below 250°–350° C., NOx reduction occurs primarily by reaction with hydrogen ($H_2$), wherein NOx purification by $H_2$ is possible.

However, since the lean NOx catalyst is usually installed in or near an engine exhaust manifold in a conventional exhaust system, the temperature to which the catalyst is exposed is as high as 800°–900° C. Further, since the lean burn engine is operated at above stoichiometric air-fuel ratios, almost no $H_2$ remains in the exhaust gas. Therefore, the NOx reduction characteristic of a lean NOx catalyst at low temperatures below 250°–350° C. has not been used in a conventional lean burn gasoline engine or diesel engine.

Therefore, there is a need for a cost effective, fuel efficient method and apparatus for decreasing $NO_x$, HCs and CO emissions from internal combustion engines. It would be desirable if the method and apparatus removed HCs, CO and NOx during cold start as well as during continuous operation of an internal combustion engine. It would be further desirable if the method and apparatus could be implemented on existing engines and did not require large inventories of chemicals.

SUMMARY OF THE INVENTION

The present invention provides an emissions preventing apparatus for an exhaust pipe in communication with exhaust from an internal combustion engine. The apparatus has an oxidizing catalyst bed disposed in the exhaust pipe and a reducing catalyst bed disposed in the exhaust pipe downstream from the oxidizing catalyst bed. A source of hydrogen has a first control valve providing fluid communication with the oxidizing catalyst bed and a second control valve providing fluid communication with the reducing catalyst bed. A source of oxygen has a control valve providing fluid communication with the oxidizing catalyst bed. A control system is provided for conditioning the oxidizing catalyst bed prior to receiving significant amounts of exhaust having a component selected from HCs, CO or combinations thereof and conditioning the reducing catalyst bed prior to receiving significant amounts of exhaust having NOx.

Preferably, the oxidizing catalyst bed comprises a three way catalyst that is conditioned during a cold start ignition by opening the first hydrogen control valve and the oxygen control valve. The reducing catalyst bed is preferably conditioned by opening the second hydrogen control valve. The oxidizing catalyst bed is preferably conditioned until reaching a light off temperature while the reducing catalyst can be conditioned continuously or discontinuously throughout operation of the internal combustion engine. Preferably, the reducing catalyst monolith includes essentially no catalysts capable of oxidizing nitrogen.

Preferably, hydrogen delivery ports are provided in communication with one or more regions of the reducing catalyst monolith. The hydrogen source preferably includes an on-board electrolyzer having an anode for producing oxygen, wherein the anode is in fluid communication with the oxygen source. The hydrogen source may also be in fluid communication with the internal combustion engine.

In another embodiment of the present invention, there is provided a method for treating the exhaust gas from an internal combustion engine. The method includes passing the exhaust gas over one or more oxidizing catalysts and then over one or more reducing catalysts; oxidizing the exhaust gas over the oxidizing catalyst; providing hydrogen gas into the reducing catalysts; and reducing the exhaust gas over the reducing catalysts. Preferably, the one or more reducing catalysts is selected from Pt, Ru, Pt-alloys, Ru-alloys or combinations thereof.

Preferably, hydrogen is provided to the reducing catalysts and nitrogen oxides are reduced to nitrogen gas and water vapor at the reducing catalysts. Typically, the exhaust gas comprises one or more oxidizable components selected from hydrocarbons, carbon monoxide or combinations thereof and one or more reducible components selected from nitrogen oxides, sulfur oxides or combinations thereof. In accordance with the invention, the internal combustion engines can burn fuel selected from gasoline, diesel, natural gas or methanol.

In a preferred embodiment, the hydrogen is provided to the reducing catalysts only after an engine warm-up period. Hydrogen can be substantially continuously provided to the reducing catalysts after the engine warm-up period or it can be pulsed. The hydrogen may also be provided to the reducing catalysts before an engine warm-up period to condition the reducing catalysts prior to introducing nitrogen oxide. Alternatively, the hydrogen is preferably provided to the reducing catalysts before the exhaust gas stream contacts the reducing catalysts. Preferably, hydrogen and oxygen are provided to the oxidizing catalysts at a time selected from before the internal combustion engine is started or before the exhaust gas stream contacts the first catalyst monolith.

In addition, the oxidizing catalysts may be heated by exothermic catalytic combination of hydrogen and oxygen up to a light-off temperature. After the engine warm-up period, the hydrogen may be substantially continuously provided to the reducing catalysts or pulsed depending on the temperature of the reducing catalyst. If the reducing catalyst is too hot, the hydrogen delivery may be interrupted until the temperature drops to an acceptable level for optimal NOx reduction.

The hydrogen is preferably produced electrolytically at a rate proportional to the load on the internal combustion engine. The electrolyzer can be started and hydrogen provided to the reducing catalysts only after an engine warm-up period. After the engine warm-up period the hydrogen is substantially continuously provided to the reducing catalysts or the hydrogen is discontinuously provided to the reducing catalysts. The oxidizing catalysts are preferably heated by exothermic catalytic combination of hydrogen and oxygen up to a light-off temperature.

A portion of the electrolytically produced hydrogen can be accumulated in a hydrogen storage vessel. The hydrogen provided to the oxidizing catalysts during cold start is preferably supplied from the hydrogen storage vessel. Hydrogen delivery to the oxidizing catalysts is preferably stopped after the oxidizing catalysts reach a light-off temperature.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
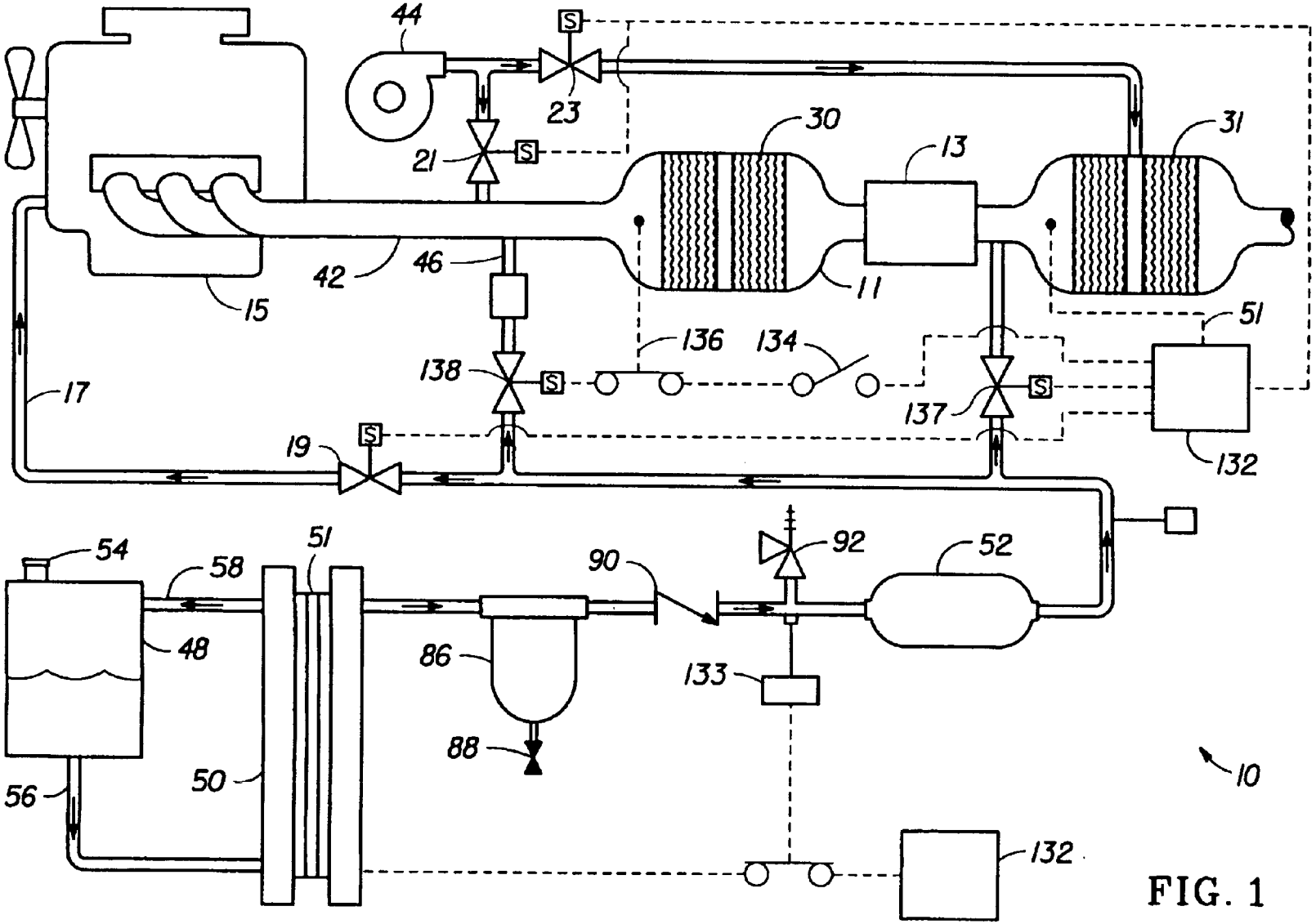
FIG. 1 is a schematic diagram of the apparatus of the present invention for catalytically reducing emissions from internal combustion engines.

The present invention relates to a process for catalytically converting HCs, CO, and $NO_x$ in stationary and mobile sources such as boilers, smelters, diesel generators, jet engines, gas turbine engines, automobiles, and trucks under cold start and during continuous operating conditions. More specifically, the process involves introducing hydrogen gas and a source of oxygen gas, if needed, into an exhaust stream upstream of an oxidation catalyst to bring the oxidation catalyst to its light off temperature quickly, thus enhancing the catalytic oxidation of HCs and CO into $C0_2$ and $H_2O$. Simultaneously, hydrogen gas is introduced upstream of a reducing catalyst to catalytically reduce $NO_x$ into harmless $H_2O$ and $N_2$, where the educing catalyst is located downstream of the oxidizing catalyst.

More specifically, the invention relates to a system for cleaning up lean burn exhaust that is applicable to a "lean burn engine" which uses a dilute air-fuel mixture in order to improve fuel economy, as well as a diesel engine, a hydrogen engine and a Stirling engine (an external-combustion engine) and which is capable of effectively reducing and cleaning up nitrogen oxides in the exhaust irrespective of its concentration of oxygen gas without impairing the good fuel economy of those engines.

One aspect of the present invention provides a system that removes HCs, CO and $NO_x$ emitted from a stationary or mobile internal combustion engine under cold start and during continuous operating conditions by providing temporally and spatially a hydrogen enriched oxidizing environment and a hydrogen enriched reducing environment. The system includes a reducing catalytic converter having at least one monolith that is coated with a catalyst suited for reducing $NO_x$ and an oxidizing catalytic converter having at least one monolith coated with a catalyst suitable for oxidizing HC and CO. Hydrogen gas is injected into the exhaust pipe upstream of the oxidizing monolith prior to, during and after start up to heat the catalyst to a light off temperature. A source of oxygen may also be provided to the oxidizing catalyst. When oxygen-rich fuel mixtures are used, no oxygen is needed for the oxidizing catalyst. The exhaust stream then enters the oxidizing monolith where HCs and CO are oxidized and is passed to the reducing monolith where hydrogen gas is introduced into the reducing monolith. The hydrogen is preferably generated on board the vehicle or other equipment securing the engine. Continuous hydrogen production may be maintained on board the vehicle or stationary engine with the use of an electrolyzer, such as the proton exchange membrane (PEM) electrolyzer described in U.S. patent application Ser. No. 08/682,024 ('024) which is incorporated by reference in its entirety herein.

In another aspect of the present invention, an electrolyzer is used to produce hydrogen on demand, on board the vehicle or engine such that the current applied to the electrolyzer is increased to increase hydrogen production as the load on the engine increases. Thus, as the amount of exhaust produced increases, more current is applied to the electrolyzer to increase hydrogen production accordingly.

The ability to generate and store hydrogen on board and on demand avoids most user maintenance requirements of other systems. The hydrogen generation, storage, and delivery system described in the '024 application uses a proton exchange membrane (PEM) electrolyzer to split water into hydrogen and oxygen. As the hydrogen gas forms, it is compressed by the electrolyzer with efficiencies approaching theoretical values and without any moving or wearing components. It is not necessary to draw power from a battery, e.g., a starting, lighting, and ignition (SLI) battery, since the electrolysis process, for the replacement of hydrogen, preferably does not begin until the engine has reached operating temperature. The technical advantages of this system include, but are not limited to: (i) hydrogen is generated from a small amount of water; and (ii) there are no moving parts or wearing components. The electrolyzer system does not require any modifications to existing engines or vehicles and retrofitting can be cost-effectively accomplished. The electrolyzer is scalable to vehicles or heavy equipment of any size, ranging from small generators to engines rated at thousands of kilowatts.

Another aspect of the present invention relates to decreasing HC, CO and $NO_x$ emissions by injecting hydrogen and a source of oxygen, if needed, into an oxidizing catalytic converter prior to, during, and after startup to heat the oxidizing catalyst to an optimum catalytic temperature and injecting hydrogen into a reducing catalytic converter to condition the reducing catalyst in the reducing catalytic converter. Conditioning of the catalyst as referred to herein includes heating, cleaning, and/or activating the catalyst as well as saturating the catalyst and the catalyst support material with hydrogen. Since a muffler is usually disposed in a tail pipe of an exhaust conduit, the exhaust gas may be over cooled, particularly during very cold weather conditions, before flowing into the reducing catalytic converter.

Conventional three-way catalysts and conventional Cu/zeolite-type lean NOx catalysts using HC to reduce NOx show activity in a temperature range above 300°–400° C. and are therefore not suitable for use in the exhaust pipe near the muffler. As discussed above, however, when NOx reduction is effected by $H_2$ instead of by HC, NOx purification at low temperatures is possible. The reducing catalyst can be maintained in a temperature range of from 100°–300° C., preferably between 120°–260° C., and most preferably between 125°–200° C. It is important to note that the temperature of the reducing catalyst should not fall below about 100° C., because water vapor in the exhaust stream will convert to liquid form and saturate the zeolite, alumina, silica or other support for the catalyst, thus reducing the effectiveness of the catalyst.

The present invention makes it possible to maintain the reducing catalyst at low temperatures. With a conventional emission removal apparatus, it would be necessary to operate the catalyst at higher temperatures because HCs and CO could be oxidized off and thus would not be allowed to stick to and eventually poison the reducing catalyst. In the present invention, HCs and CO are removed by the oxidizing catalyst prior to, during, and after startup of the engine. The removal of these HCs and CO prior to, during, and after startup of the engine greatly increases the efficiency of the reducing catalyst by allowing it to be maintained at temperatures that are optimal for hydrogen initiated reduction of NOx.

The reaction between NOx and hydrogen by nature produces heat, therefore another aspect of the present invention is directed to withdrawing the heat from the reducing catalytic converter. The reducing catalyst monolith is equipped with cooling fins and/or a typical tube-in-shell heat exchanger to remove the heat from the reducing catalyst. The monolith would then have catalyst on the tube side and air flow on the shell side for cooling the monolith. The exhaust stream would pass through the tube side of the heat exchanger and contact the catalyst as it passes through the monolith. Air from an auxiliary air pump may be cooled and circulated through the heat exchanger but not into direct contact with the catalyst itself. Alternatively, suitable metallic cooling fins may be used to withdraw heat from the reducing catalytic converter. A temperature sensor can be located in or near the reducing monolith to monitor the temperature and initiate pulsed hydrogen flow when the monolith reaches a certain critical temperature. Reducing or restricting the hydrogen flow temporarily will allow the monolith to cool and the NOx reduction will continue at least to some extent with residual hydrogen present in the catalyst support material.

The lean burn engine and the diesel engine are basically the same in that the exhaust contains excess $O_2$ and the concentration $O_2$ in the exhaust increases as the air/fuel ratio increases. The catalyst for reducing and cleaning up the NOx in such $O_2$ containing exhaust is called a "lean catalyst", which is often selected from among noble metal based catalysts such as those supported on zeolite. The reaction between HC and NOx occurs mainly in the high-temperature (>350° C.) range. On the other hand, in the low-temperature (<300° C.) range, a reaction for reducing NOx with $H_2$ occurs, enabling the cleanup of NOx. Another type of catalyst for reducing and cleaning up the NOx in the $O_2$ containing exhaust is also called a "lean NOx catalyst", which is selected from among those catalysts which support noble metals such as Pt. If CO or active HC is present in gases that flow into the reducing catalytic monolith, those gases will cover the surface of the catalyst through adsorption, thereby blocking the reaction of NOx reduction with $H_2$. However, with the present invention, the HCs and CO are removed prior to, during, and after startup of the engine in the oxidizing catalytic converter, such that the temperature of the reducing catalyst can be maintained between 100°–300° C. with little concern for HC and CO adsorption on the reducing catalyst in the reducing catalytic converter.

Conventionally, the catalyzer is installed near the exhaust manifold on the engine, so the catalyst is exposed to the exhaust which is as hot as 800°–900° C. at maximum. In addition, the exhaust from the lean burn engine which uses an air-fuel mixture leaner than the stoichiometric ratio is substantially free from $H_2$. Under these circumstances, it has been impossible in the prior art to utilize the characteristics of the catalyst that is active at lower temperatures.

In contrast, the method and apparatus of the present invention have the advantage that whether the engine is operated at an air/fuel ratio richer or leaner than the stoichiometric value or at the stoichiometric ratio (i.e., irrespective of the presence or absence of $O_2$ from the exhaust or of the concentration of $O_2$ in the exhaust), NOx can be reduced with the catalyst so that the best performance of the engine and fuel can be selected without considering the conditions for reducing the NOx content.

Both the reducing and oxidizing catalytic converters described above may have more than one catalytic monolith segment within a single housing. Multiple monoliths will increase the amount of HC and CO oxidized as well as the amount of $NO_x$ reduced. Hydrogen can be introduced to all or some of the monolith segments in each catalytic converter.

On-board, on-demand electrochemically generated hydrogen greatly simplifies and readily facilitates the use of hydrogen as a controlled chemical additive to exhaust streams leading to the removal of CO, HC and $NO_x$ emissions. An automated water electrolyzer subsystem for the on-demand production of hydrogen can be easily integrated with various engines, e.g., diesel generators. Such a water electrolyzer subsystem has unique features that make it ideally suited for the proposed application. These include: (i) an instantaneous response time for initiating hydrogen generation; (ii) excellent load following capabilities enabling a rapid response to changing engine operating conditions; (iii) the capability of delivering pure hydrogen gas at pressures up to 1000 psi, if desired; and (iv) facilitates pressurized storage of hydrogen gas on-site, if needed, when carrying out maintenance and repairs. The water electrolyzer can be fully automated, thus precluding the need for manual attention or operation.

The electrolyzer can be run by supplying a small portion of the electrical energy generated by the combustion engine (diesel generator, automobile, gas turbine engine, etc.). It should also be noted that stationary engines or other sources of exhaust gas may utilize other sources of electricity. The hydrogen gas generated by the electrolyzer can be fed directly to the flue gas or exhaust gas stream and passed over an oxidizing and/or reducing catalyst. The amount of hydrogen supplied can be regulated electronically in real time by simply varying the current applied to the electrolyzer.

A hydrogen storage vessel may be used to supply hydrogen to the oxidizing and reducing catalytic converters for cold start operations to increase the temperature of the oxidizing catalytic converter as described in application '024 and to condition the reducing catalytic converter. The hydrogen is stored under pressure and is injected into the oxidizing catalytic converter, along with air, if needed, preferably delivered using a secondary air pump, to heat the oxidizing catalyst. Hydrogen may be fed from the storage vessel to the reducing catalyst simultaneously or after the engine warms up. The electrolyzer can continue to run, both to provide a sufficient stream of hydrogen to the reducing catalytic converter to reduce the $NO_x$ emissions and to replenish the stored hydrogen supply.

In addition, the stored hydrogen may be injected simultaneously into the engine as a substitute for fuel on start up. The hydrogen is preferably injected into the engine for up to one minute at start up, most preferably about 10–15 seconds, before the proscribed fuel is fed to the engine. Hydrogen addition to the oxidizing catalytic converter is preferably begun at startup and continued until the catalyst reaches a light off temperature in accordance with the cold start procedures outlined above. Hydrogen is also delivered to the reducing catalyst to condition the reducing catalyst before the NOx production becomes substantial. This system can be adapted to work with engines that use gasoline, diesel, gasohol, methanol, natural gas or other fuels.

Hydrogen can be delivered intermittently to the reducing catalyst to increase the amount of NOx reduced. A component which occludes nitrogen oxides is added to the catalyst for reducing nitrogen oxides while the feeding of the reducing agent ($H_2$) is suspended. This helps increase the concentration of the NOx in the catalyst. If the hydrogen is delivered in pulses, the temperature of the reducing catalyst goes down, further increasing the overall reduction of NOx. The component used to occlude NOx, can be selected from alkali metals, alkaline earth metals and mixtures thereof and loaded on the reducing catalyst.

Suitable reducing catalysts that are useful in hydrogen initiated catalytic reduction of $NO_x$ include noble metal catalysts such as Pt, Ru, and metal alloys based on Pt and Ru. It is preferred that the noble metal catalysts are highly distributed on a carrier having a high specific surface area (greater than 100 $m^2/g$) such as alumina, silica, or zeolite.

Other zeolite-based catalysts may be useful for reducing NOx such as Cu based ZSM-5 catalyst. ZSM-5 reduces $NO_x$ under a wider range of temperatures in a net oxidizing stream, even with water and $SO_2$ in the stream. Therefore, zeolite catalysts appear to be highly suitable for lean burn diesel and jet engines. In addition to Cu-ZSM-5, it is believed that Indium or Gallium based ZSM-5 catalysts may also be useful catalysts for NOx reduction.

It is believed that the $Pt/TiO_2$ catalyst for $NO_x$ conversion may be suitable for gasoline engines, but may not be as effective in diesel-powered engines, which operate under excess air conditions, without a means for removing excess oxygen prior to reducing the $NO_x$. However, $Pt/TiO_2$ and $Ru/TiO_2$ catalysts, along with the aforementioned catalysts may be useful in any type of engine by adjusting the concentration ratios of the catalyst to optimize the use of hydrogen as a reactant and reduce the likelihood that the hydrogen will be converted to water as a result of combining with oxygen.

A cost-effective, safe, reliable and energy-efficient technology for on-site, on-demand generation of pure hydrogen is provided by the electrolyzer described in application number '024. The electrolyzer, when supplied with electrical energy, splits water into hydrogen and oxygen. In a proton-exchange-membrane (PEM) electrolyzer, protons are transported through the solid membrane electrolyte from the anode to the cathode. At the surface of the cathodic electrocatalyst, the protons recombine with electrons from an external circuit and are liberated as hydrogen gas molecules.

The lifetime of PEM water electrolyzers has been demonstrated to be in excess of 14 years and projected to be over 30 years, depending on the operating conditions. Water electrolyzers have been employed in several applications, especially, where reliability and purity of the gases produced are the primary concerns. The water electrolyzer disclosed herein is extremely effective in rapidly preheating the oxidizing catalytic converter of gasoline powered vehicles or other engines. The electrochemically generated hydrogen and a source of secondary air if required are introduced directly upstream of the oxidizing catalytic converter and the converter is rapidly brought to operating temperature by the catalytic combination reaction. With an air flow rate of 90 liters per minute mixed with 11 vol % hydrogen, the front face of a catalyst-coated ceramic monolith reached 400° C. within two seconds and 9% of the ceramic was heated to 400° C. in three seconds.

FIG. 1 shows a system 10 of the present invention installed on a vehicle exhaust system. The vehicle includes an oxidizing catalytic converter 11 located in an exhaust line 42 from a vehicle's engine 15 exhaust manifold, a reducing catalytic converter 31 in communication with the exhaust line 42 and an optional muffler 13 in the exhaust line 42 in between the oxidizing and reducing catalytic converters as shown. The exhaust line 42 is provided with air, if required, from an air pump 44 and hydrogen from a hydrogen inlet line 46. The air pump could be any suitable air source, such as a receiver, for injecting air into the exhaust line at suitable pressure and volumetric flow rate to achieve the ideal air/hydrogen ratio mixture for heating the oxidizing catalyst in the converter 11.

The hydrogen supply system of the invention generally includes a water reservoir 48, an electrolyzer 50, and an optional hydrogen storage cylinder 52. As shown in FIG. 1, the electrolyzer 50 may preferably compromise a plurality of stacked identical cells 51. The reservoir 48 serves both as a water reservoir and as a separator for oxygen and water. The reservoir 48 may be a vehicle's windshield washer fluid storage container, but is preferably a dedicated separator allowing collection and storage of oxygen via port 54. Water flows by gravity drain or is pumped from the reservoir 48 to the electrolyzer 50 via a drain line 56. As the electrolyzer produces hydrogen and oxygen, the oxygen and entrained water flows naturally back to the reservoir 48 via a return line 58.

Figure 2:
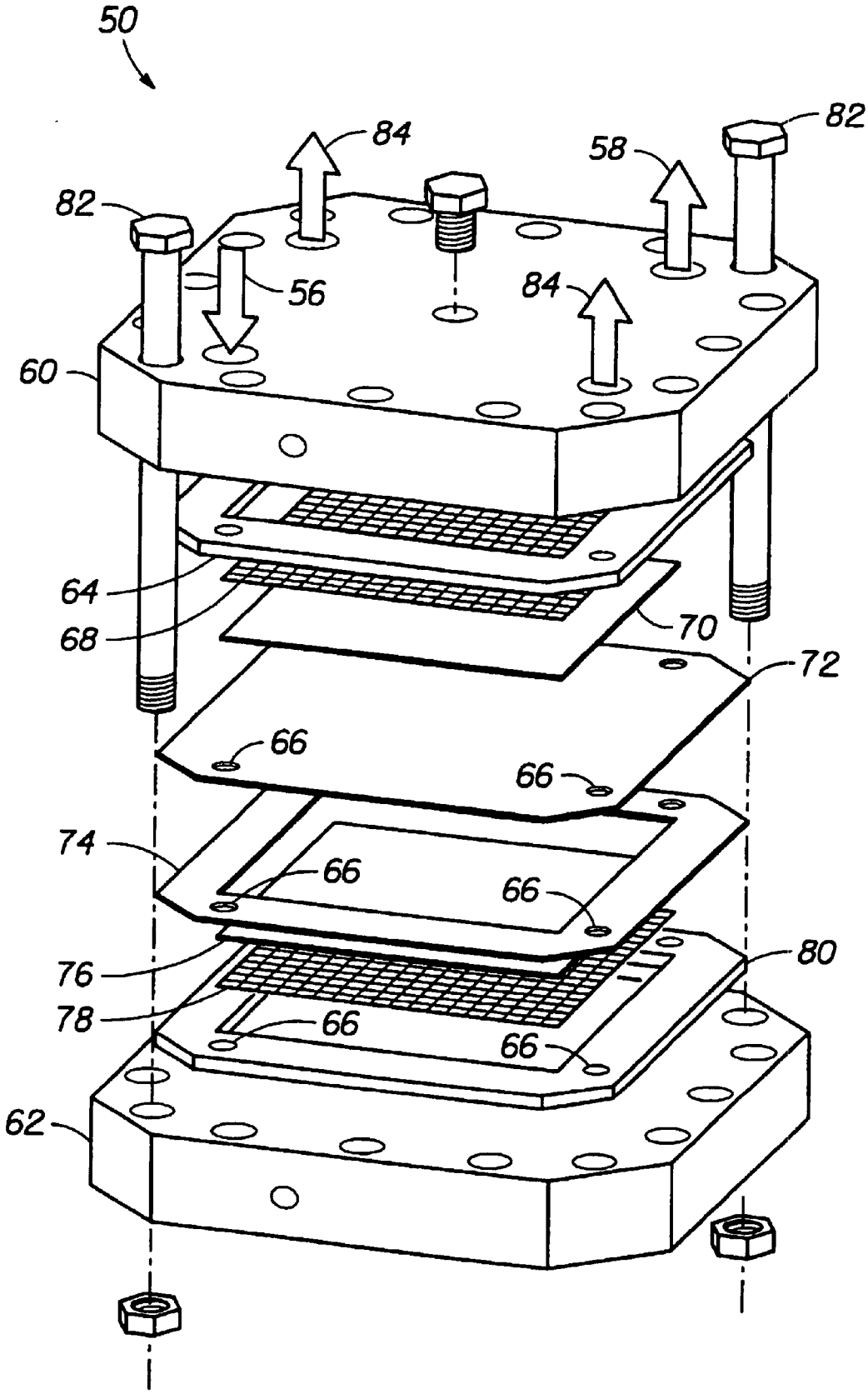
FIG. 2 is an exploded view of an electrolyzer that may be employed in the present invention.

The next major component of the hydrogen source is the electrolyzer 50, shown in greater detail in FIG. 2. In the following description of the electrolyzer 50, the materials of construction referred to as "preferred" are the materials used in a test device to prove that the electrolyzer 50 works for its intended purpose. In commercial production models of the present invention, where possible, less expensive materials will be used throughout, such as carbon steel for titanium where possible, and plastic such as polypropylene where heat and stress will permit the use of such material.

The electrolyzer 50 may be referred to herein as a proton exchange membrane (PEM) electrolyzer 50. The proton exchange membrane itself may prove corrosive in this environment in contact with certain substances, thus requiring the careful selection of the material of construction of the electrolyzer. For example, the PEM should only contact carbon or graphite. However, those of skill in the art will readily recognize where less exotic materials than those listed in the following discussion that are located away from the PEM material itself and the oxygen electrode catalyst can be readily employed without penalty. For example, graphite will be the material of choice in certain structural elements, and not some obvious candidates such as copper, aluminum, or iron, which can corrode thus forming ions that can poison the oxygen and/or hydrogen electrode catalysts.

Now referring to FIG. 2, the PEM electrolyzer 50 is shown as a cell stack including a pair of endplates 60 and 62. The endplates 60 and 62 are preferably titanium and measure 4.2"×4.2"×¼". Adjacent the top endplate 60 is an anodic cell frame 64. The cell frame 64 is preferably a carbon fiber-filled TEFLON sheet, sold under the trademark ZYMAXX by Du Pont. The cell frame 64 retains a 1:1 molar ratio of iridium and ruthenium dioxides ($IrO_2/RuO_2$) as the anodic electrocatalyst. The cell frame 64 also includes a plurality of flow ports 66 to permit the supply of reactant (water) and/or removal of electrolysis product (oxygen gas). Below the cell frame 64 is an expanded titanium metal current collector (flow field) 68, preferably 25 Ti 40-3/32 from Exmet Corp. An anode substrate 70 is preferably a porous titanium plate measuring 2.49"×2.49"×0.05". Below the anode substrate 70 is a proton exchange membrane 72, cut from a sheet of NAFION 117 from Du Pont which serves as a solid electrolyte material and which is 175 μm thick.

FIG. 2 depicts a gasket 74, one of perhaps several installed where required. Gaskets 74 are stamped from 0.033 inch thick fluorosilicone sheet (Viton) and from 0.005 inch thick unsintered PTFE sheet. The electrolyzer 50 further includes a cathode substrate 76 like the anode substrate 70 and an expanded titanium flow field.

Finally, the PEM electrolyzer 50 includes a cathodic cell frame 80 formed of polychlorotrifluorethylene (PCTFE) sheet, sold under the trademark KEL-F by Afton Plastics. The cathodic cell frame 80 retains a fuel cell gas diffusion electrode containing high surface area colloidal platinum, supported on platinum black, having platinum loading of 4.0 $mg/cm^2$ as the cathodic electrocatalyst layer.

As shown in FIG. 2, the various components of the PEM electrolyzer are stacked together and retained with a plurality of tie rods 82, preferably 16 such tie rods. Stainless steel tubing, such as SS316, are then screwed into four threaded ports on one of the titanium endplates. The ports are the water inlet port 56, the oxygen outlet port 58, and a pair of hydrogen outlet ports 84. To minimize electrical contact resistance, the titanium endplates 60 and 62 and the expanded titanium metal current collectors 68 and 78 may be electroplated with a thin film of gold or other noble metals, such as platinum.

The cathode and the anode of the electrolyzer are of special construction. The cathodic electrode structure for hydrogen evolution is fashioned from a commercially available fuel cell gas diffusion layer on a carbon cloth backing, which acts as a support for the active hydrophilic electrocatalyst layer. This active layer contains high surface area colloidal platinum (100 $m^2/g$), supported on carbon black (60 wt % Pt on C), yielding a platinum loading of 4.0 $mg/cm^2$. The cathodic electrode structure, having an area of 40 $cm^2$, was hot-pressed onto one side of a segment of precleaned NAFION 117 PEM material. Hot-pressing was carried out between the plates of a hot-press elevated to 200° C. for 60 seconds, and using a force of 15,000 pounds.

For the anodic electrocatalyst layer, a 1:1 molar ratio of iridium and ruthenium chlorides are dissolved in ca. 8 ml of concentrated HCl and heated to almost dryness. The resulting chlorides are then dissolved in isopropanol to make an ink-line coating. A porous titanium plate, 0.05" in diameter from Astro Met of Cincinnati, Ohio, is etched in 12% $HBF_4$ for 60 seconds and rinsed with isopropanol. This substrate is then coated with the ink-like mixture and the solvent evaporated under low heat of about 90° C. This coating and drying procedure is repeated seven times, then the electrode is heated in a furnace at 400° C. for 10 minutes in ambient air. The coating, drying, and furnace treatment is repeated twice more, but with a final baking time of two hours instead of 10 minutes.

Figure 3:
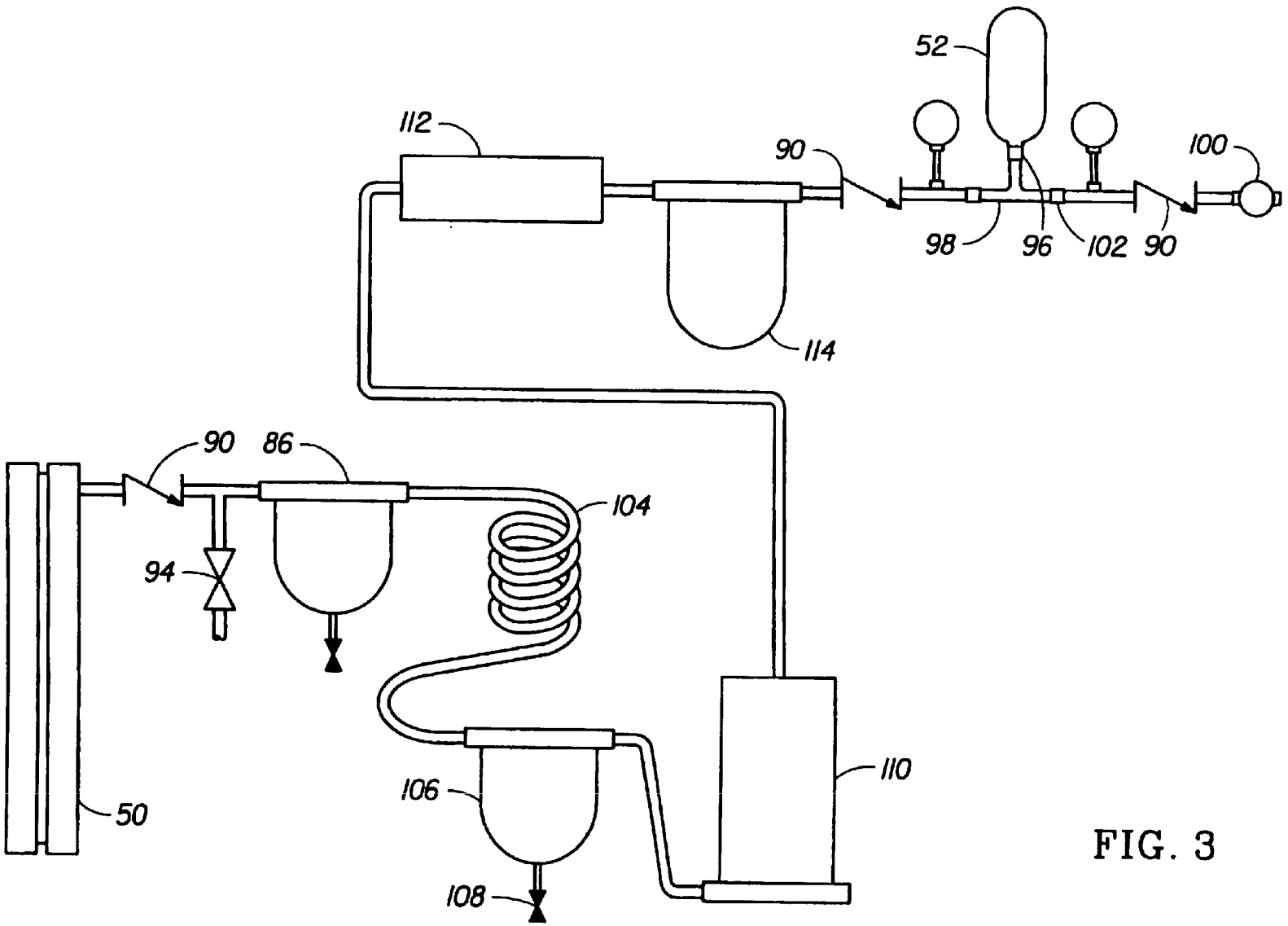
FIG. 3 is a schematic of a hydrogen capturing and handling detail used with the system of the present invention.

Referring back to FIG. 1, the system further includes a hydrogen storage cylinder and various supporting components in addition to the reservoir 48 and the electrolyzer 50, described above. The components include a liquid water trap 86 to eliminate most of the entrained water from the hydrogen exiting the electrolyzer, a solenoid valve 88 to blow out the trap, a check valve 90, and a pressure relief valve 92 to protect the system against over pressurization. FIG. 3 depicts additional details and a preferred arrangement of the hydrogen gas handling and capture system.

As previously described, the electrolyzer 50 includes a proton exchange membrane in its construction so that generated oxygen is vented to the water source reservoir and the hydrogen generated can be accumulated at pressure. Prior to operation, the system of FIG. 3 permits purging with an inert gas, such as nitrogen. For safety reasons, all air is first removed from the system by attaching a nitrogen gas feedline at a purge gas inlet 94 downstream of a check valve 90. During the purging operation, the hydrogen storage cylinder or vessel 52, such as a metal hydride vessel, is detached at a quick disconnect 96. This operation effectively seals both the vessel 52 and a gas line 98, to keep the purge gas out of the vessel 52. The remainder of the system is then purged from the purge gas inlet 94 through a back pressure regulator 100.

To charge the system with hydrogen, the needle valve 102 between the storage vessel 52 and the back pressure regulator 100 is shut. Hydrogen gas generated by the electrolyzer is processed through a four-stage process to remove entrained water (liquid or vapor) and any oxygen contaminant from the hydrogen stream before storage. The first step involves removal of a small amount of entrained liquid water coming from the electrolyzer in the hydrogen gas. This entrained liquid water is removed without a pressure loss by means of the entrained liquid water trap 86. The second step involves cooling the hydrogen gas stream from the electrolyzer temperature to ambient in a condensing coil 104. The electrolyzer typically operates at about 20° C. above ambient, with the exact temperature depending on specific electrolyzer operating conditions. This second step condenses a substantial portion of the water vapor in the hydrogen gas stream. This condensed water could absorb a significant amount of alcohol, which may be present during operation using windshield washer fluid as the electrolyzer reactant feed. The condensate is collected in a condensate collector 106 and removed through a drain valve 108.

At this point, the hydrogen gas stream is still saturated with water vapor, but now at a lower temperature. This saturated gas stream is next passed into a zeolite-filled gas drier 110. This drier absorbs water vapor and any alcohol vapor present when using a windshield washer fluid feed. Any oxygen contaminant present in the hydrogen gas stream is then eliminated in a catalytic recombiner or oxygen eliminator 112 to reduce it to water. Final clean-up of the hydrogen gas stream is accomplished in a second zeolite absorber bed in a polishing drier 114. The polishing drier removes traces of water produced by the catalytic recombiner 112.

The hydrogen gas handling system of FIG. 3 is designed for relatively short term operation; longer term operations, for example 100,000 miles, would utilize other methods of water removal known in the art. A satisfactory metal hydride hydrogen storage unit is available from Hydrogen Consultants of Littleton, Colo. Such an available unit can store 30 liters of hydrogen which can be delivered at 30–45 psig, with recharging using hydrogen gas at 100–200 psig. More preferably, the hydrogen storage vessel is a pressure vessel made of a composite structure, aluminum or ferrous-based alloys. A suitable hydrogen storage vessel of this type is available from Harless Specialties.

Referring back to FIG. 1, a power source 132 is coupled to a first hydrogen solenoid valve 138, a second hydrogen solenoid valve 137 and a third hydrogen control valve 19 upon engaging the ignition switch 134. The third hydrogen control valve 19 provides fluid communication between the hydrogen source and the internal combustion engine 15 through a flow line 17. The solenoid valve 137 may be opened when a thermocouple (not shown) indicates that the engine 15 has reached a certain temperature where NOx emissions are likely to be produced. Alternatively, the solenoid valve 137 may be opened at a predetermined period of time after ignition of the engine. In order to control the flow of hydrogen to the oxidizing catalyst, the solenoid valve 138 may remain open or be pulsed until the thermocouple 136 reads a temperature equal to or greater than the light-off temperature. In another embodiment, the hydrogen outlet from the electrolyzer may be provided in direct fluid communication with the reducing catalytic converter instead of passing through the storage vessel 52.

Air from the air pump 42 may be delivered to a tube-in-shell heat exchanger in communication with the reducing catalyst in order to cool the catalyst. Temperature sensor 51 can be located in the reducing monolith 31 similar to thermocouple 136. When the temperature in the reducing monolith approaches a critical high temperature (above the optimum working temperature set by the operator) air may be circulated through the heat exchanger to cool the monolith. On the other hand, if the temperature falls below 100° C., air and/or hydrogen can be introduced into contact with the reducing catalyst monolith to increase the temperature of the monolith.

Also in FIG. 1, the electrolyzer 50 receives power from the source 132 when the hydrogen pressure in or near the hydrogen storage vessel 52, as indicated by pressure sensor 133, falls below a setpoint pressure between about 50 psig and about 400 psig. It should be recognized that the power to the electrolyzer 50 is turned off when the pressure exceeds a high pressure setpoint, such as 400 psig. It should also be recognized that many other conditions may be considered in controlling the electrolyzer.

Figure 4:
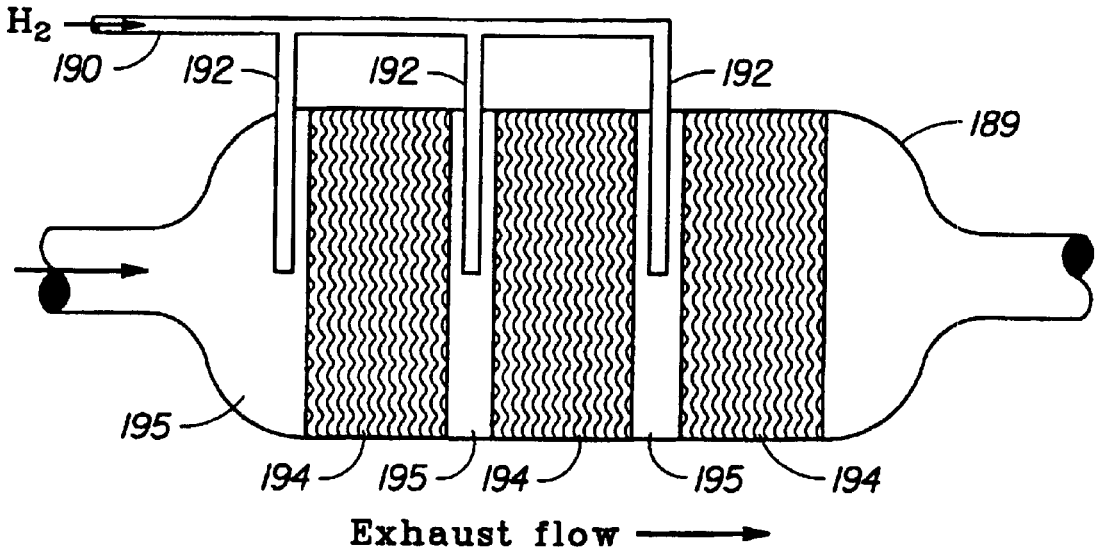
FIGS. 4 and 5 are catalyst monoliths having a hydrogen distributor.
Figure 5:
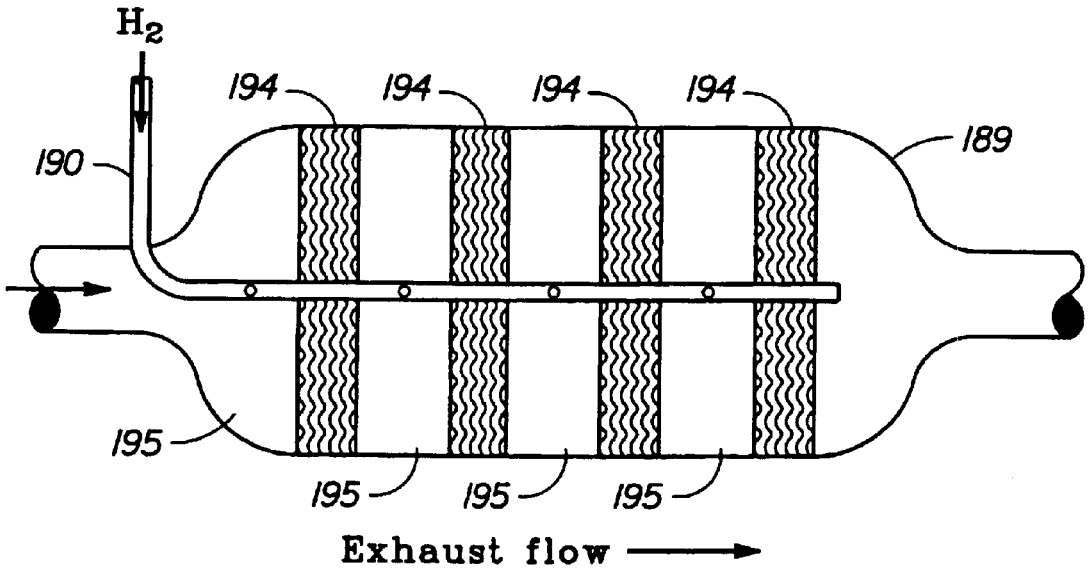

FIGS. 4 and 5 are schematic views of two catalytic converters 189 having hydrogen injection manifolds 190. The design of the catalytic converters shown may be used for the reducing and the oxidizing catalytic converters. In each of the figures, the converters 189 have multiple monoliths 194 separated by a short distance for hydrogen introduction and diffusion. In FIG. 4, the manifold is external to the converter 189 with a plurality of injection tubes 192 delivering hydrogen into the gaps 195. Conversely, in FIG. 5 the manifold is in the center of the monolith 194 with a plurality of holes for hydrogen delivery into the gaps 195.

What is claimed is:

1. An apparatus for treating exhaust from an internal combustion engine in communication with an exhaust pipe, comprising:

an oxidizing catalyst bed disposed in the exhaust pipe;

a reducing catalyst bed disposed in the exhaust pipe downstream from the oxidizing catalyst bed;

a source of hydrogen having a first control valve providing fluid communication with the oxidizing catalyst bed[.] *and* a second control valve providing fluid communication with the reducing catalyst bed[, and a third control valve providing fluid communication with the internal combustion engine];

a source of oxygen having a control valve providing fluid communication with the oxidizing catalyst bed; and a control system for conditioning the oxidizing catalyst bed prior to receiving significant amounts of exhaust having a component selected from hydrocarbons, carbon monoxide, and combinations thereof, *and* conditioning the reducing catalyst bed prior to receiving significant amounts of exhaust having $NO_x$[, and providing hydrogen to the internal combustion engine during cold start].

2. The system of claim 1, wherein the oxidizing catalyst bed is conditioned during a cold start ignition by opening the first hydrogen control valve and the oxygen control valve.

3. The system of claim 1, wherein the reducing catalyst bed is conditioned by opening the second hydrogen control valve.

4. The system of claim 2, wherein the oxidizing catalyst bed is conditioned until reaching a light off temperature.

5. The system of claim 1, wherein the reducing catalyst is conditioned selectively continuous or discontinuous throughout operation of the internal combustion engine.

6. The system of claim 1, wherein the oxidizing catalyst bed is selected from a two-way catalyst and a three-way catalyst.

7. The system of claim 1, further comprising hydrogen delivery ports in communication with one or more regions of the reducing catalyst bed.

8. The system of claim 1, wherein the reducing catalyst bed includes essentially no catalyst for oxidizing nitrogen.

9. The system of claim 1, wherein the source of hydrogen includes an on-board electrolyzer.

10. The system of claim 9, wherein the on-board electrolyzer has an anode for producing oxygen, and wherein the anode is in fluid communication with the oxygen source.

11. The system of claim 1, wherein the *source of hydrogen further comprises a* third control valve *to* provide[s] hydrogen to the internal combustion engine during cold start.

12. A method for [preventing and] treating exhaust gas from an internal combustion engine, comprising:

[supplying hydrogen fuel to an internal combustion engine during cold start;]

*providing a source of hydrogen and a source of oxygen to the one or more oxidizing catalysts at a time selected from before the internal combustion engine is started and before the exhaust gas stream contacts the one or more oxidizing catalysts;* passing the exhaust gas over one or more oxidizing catalysts and then over one or more reducing catalysts;

oxidizing one or more oxidizable components in the exhaust gas over the one or more oxidizing catalysts;

providing hydrogen gas to the one or more reducing catalysts*, wherein the hydrogen is provided to the one or more reducing catalysts after the engine warm-up period*; and reducing one or more reducible components in the exhaust gas over the *one or more* reducing catalysts.

13. The method of claim 12, wherein the one or more reducing catalysts are selected from Pt, Ru, Pt-alloys, Ru-alloys and combinations thereof.

14. The method of claim 12, wherein the one or more reducible components comprises a nitrogen oxide, and wherein the nitrogen oxide is reduced to nitrogen gas and water vapor at the one or more reducing catalysts.

15. The method of claim 12, wherein the one or more oxidizable components are selected from hydrocarbons, carbon monoxide and combinations thereof and the one or more reducible components includes a nitrogen oxide.

16. The method of claim 12, wherein the internal combustion engine burns a fuel selected from gasoline, diesel, natural gas and methanol after cold startup.

[17. The method of claim 16, further comprising:

providing hydrogen and oxygen to the one or more oxidizing catalysts at a time selected from before the internal combustion engine is started and before the exhaust gas stream contacts the one or more oxidizing catalysts.]

18. The method of claim [17] *12*, further comprising:

heating the one or more oxidizing catalysts by exothermic catalytic combination of hydrogen and oxygen up to a light-off temperature.

19. The method of claim [17, wherein the hydrogen is substantially continuously provided] *12, further comprising providing hydrogen* to the one or more reducing catalysts [after] *before* the engine warm-up period.

20. The method of claim 12, wherein the hydrogen is provided to the one or more reducing catalysts only after an engine warm-up period.

21. The method of claim 20, wherein the hydrogen is substantially continuously provided to the one or more reducing catalysts after the engine warm-up period.

22. The method of claim [12] *19*, wherein the hydrogen is provided to the one or more reducing catalysts before [an] *the* engine warm-up period to condition the one or more reducing catalysts prior to introducing nitrogen oxides.

23. The method of claim 12, further comprising electrolytically producing the hydrogen at a rate proportional to the load on the internal combustion engine.

24. The method of claim 23, further comprising:

storing a portion of the produced hydrogen in a hydrogen storage vessel.

25. The method of claim 24, wherein the hydrogen provided to the one or more oxidizing catalysts is supplied from the hydrogen storage vessel.

26. The method of claim 25, further comprising:

stopping hydrogen to the one or more oxidizing catalysts after the oxidizing catalysts reach a light-off temperature.

27. The method of claim 23, further comprising:

starting the electrolyzer and providing hydrogen to the reducing catalysts only after an engine warm-up period.

28. The method of claim [27] *12*, wherein the hydrogen is substantially continuously provided to the one or more reducing catalysts after the engine warm-up period.

29. The method of claim [27] *12*, wherein the hydrogen is discontinuously provided to the one or more reducing catalysts after the engine warm-up period.

30. The method of claim 12, further comprising:

heating the one or more oxidizing catalysts by exothermic catalytic combination of hydrogen and oxygen up to a light-off temperature.

31. The method of claim 12, further comprising:

providing hydrogen to the one or more reducing catalysts before the exhaust gas stream contacts the one or more reducing catalysts.

32. The method of claim [12] *36*, wherein the hydrogen is provided into the internal combustion engine for about one minute or more following startup.

33. The method of claim [12] *36*, wherein the hydrogen is provided into the internal combustion engine for between about 30 seconds and about one minute.

34. The method of claim [12] *36*, wherein the hydrogen is provided into the internal combustion engine for between about 10 and about 15 seconds.

35. The method of claim 12, wherein the one or more reducing catalysts are disposed on a support material selected from alumina, silica, zeolite, and titanium dioxide.

*36. The method of claim 12, further comprising supplying hydrogen fuel to an internal combustion engine during cold start.*

* * * * *